United States Patent [19]

Jennings

[11] Patent Number: 4,689,317

[45] Date of Patent: Aug. 25, 1987

[54] CATALYST PRECURSOR FOR AMMONIA SYNTHESIS AND PROCESS FOR ITS PRODUCTION

[75] Inventor: James R. Jennings, Yarm, England

[73] Assignee: Imperial Chemical Industries PLC, London, England

[21] Appl. No.: 841,185

[22] Filed: Mar. 19, 1986

Related U.S. Application Data

[63] Continuation-in-part of Ser. No. 758,413, Jul. 24, 1985.

[30] Foreign Application Priority Data

Aug. 3, 1984 [GB] United Kingdom ................ 8419851
Mar. 25, 1985 [GB] United Kingdom ................ 8507691
Jan. 24, 1986 [GB] United Kingdom ................ 8601716

[51] Int. Cl.$^4$ .......................... B01J 21/04; B01J 23/78
[52] U.S. Cl. .................................... 502/330; 423/363
[58] Field of Search ................ 502/330; 423/362, 363

[56] References Cited

U.S. PATENT DOCUMENTS 4,298,588 11/1981 Pinto ............................... 423/362 X

FOREIGN PATENT DOCUMENTS 598632 3/1978 U.S.S.R. ............................. 502/330

OTHER PUBLICATIONS

Rubinshtein et al., "Extensive Study of the Iron Catalysts of Ammonia Synthesis", Kinetika i Kataliz, 1965, 6, (2), pp. 285-293.

Primary Examiner—W. J. Shine
Attorney, Agent, or Firm—Cushman, Darby & Cushman

[57] ABSTRACT

An ammonia synthesis catalyst precursor having a high BET surface area and containing oxides of iron, cobalt, aluminum, and an alkali metal of atomic number equal to, or greater than, 19. On reduction the precursor gives a catalyst having a high initial activity relative to that of a catalyst obtained by reduction of a standard fused, cobalt-free, precursor.

The precursor may be made by precipitation followed by calcination.

6 Claims, No Drawings

CATALYST PRECURSOR FOR AMMONIA SYNTHESIS AND PROCESS FOR ITS PRODUCTION

This application is a continuation-in-part of Ser. No. 758,413 filed July 24, 1985 and relates to catalysts and in particular to an oxidic precursor of an iron catalyst and a method for producing it.

Iron catalysts used in ammonia synthesis are commonly made by steps including melting iron oxide possibly containing small quantities of other oxides, solidifying the melt and crushing the solid to the required particle size. It has been proposed, for example by Rubinshtein et al. (Kinetika i Kataliz, 1965, 6(2), 285-293, published in translation by Consultants Bureau, New York, USA), to make an ammonia synthesis catalyst by co-precipitation of ferric hydroxide and aluminium hydroxide, calcination of the precipitate at 600° C. to convert the hydroxides to oxides, reduction of the iron oxide to metal, and promotion with potash, before or after reduction.

The experimental results quoted by Rubinshtein et al indicate that the most active of these catalysts, when tested at 450° C., 300 atmospheres pressure, and using a space velocity of 30,000 hr$^{-1}$, gives a yield of ammonia of 18.5%.

We have found however that if the calcination temperature is not so high, catalysts with greater activity can be made as the precipitated oxidic precursor compositions then have by a much higher surface area (BET method using nitrogen) than precursors prepared by the fusion route: while the latter generally have a BET surface area below 1 m$^2$.g$^{-1}$, precipitated oxidic precursors calcined at below 500° C. generally have a BET surface area of at least 20 m$^2$.g$^{-1}$.

Upon reduction of the precursor to convert the iron oxide to active metal catalyst, such precursors having a high BET surface area give rise to catalysts in which the active metal surface area (as estimated by nitrous oxide decomposition) is significantly higher thaan in catalysts prepared by the fusion route.

Despite their lower density compared to fused catalysts, precursors made by precipitation can give rise to catalysts having a greater activity per unit catalyst bed volume than catalysts made by the fusion route.

The alumina serves to act as a stabiliser to reduce sintering of the active metal on reduction and/or during use: Such sintering reduces the effective surface area of the active metal. Even so there is generally a marked decline in catalytic activity with time.

We have now devised catalysts which have a particularly high activity: in some cases the decline in activity is less pronounced. In the present invention, some of the iron is replaced by cobalt.

Ammonia synthesis catalysts derived from precipitated iron and cobalt compounds have been studied by Komarov and co-workers and are described in Russian patent Nos. 535958, 539601, 598632, 697178, 810257, 818646 and 988327. The disclosed compositions, prior to reduction, generally contain about 8-11% $^w$/wcobalt oxide although SU 818646, wherein the precursors are sintered at high temperatures, discloses the use of a somewhat higher proportion, viz 13.8% $^w$/w, cobalt oxide. In this work, to enhance the activity, Komarov and co-workers, added materials such as magnesia, alkaline earth aluminates, zirconia, and alkaline earth zirconates, to the precipitated iron and cobalt compounds prior to calcination and promotion with potash. In these Komarov et al patents the activity of the catalysts was assessed at high pressure, generally 300 atmospheres (i.e. approx. 300 bar abs) and at various temperatures. At 450° C., 300 atmospheres pressure, and space velocity 30,000 hr$^{-1}$, the maximum ammonia concentration achieved was 21.9%—see SU No. 598632. Under those conditions the equilibrium ammonia concentration is about 36%. The more active the catalyst then under any set conditions, the closer will be the ammonia concentration to the equilibrium concentration. By applying standard kinetic and thermodynamic equations, it is possible to calculate what ammonia concentration would be achieved, and hence calculate the activity, at other pressures.

To aid comparison it is convenient to relate the activities to those of a standard catalyst under standard test conditions. In this specification, the standard catalyst employed is that obtaned by reduction of a commercial ammonia synthesis catalyst precursor, 35-4 sold by Imperial Chemical Industries plc, and which is a fused mixture of oxides of approximate composition (% $^w$/w):

alumina—2.5
calcium oxide—2.0
magnesia—0.3
silica—0.4
potassium oxide—0.8
magnetite—balance.

The standard conditions are detailed hereinafter and employ a pressure of 50 bar abs. and a temperature of 450° C.

The relative initial activity, I, of a catalyst under consideration is the ratio of the initial rate constant determined under the standard conditions per unit catalyst precursor weight to that of the standard.

The following table shows the ammonia concentration calculated for a space velocity of 30,000 cm$^3$ of gas per hour per g of catalyst at 450° C. and 50 and 300 bar abs. pressure for catalysts of various relative activities and also the equilibrium concentration at 450° C. and those pressures.

|  | Ammonia concentration (%$^v$/v) | |
| --- | --- | --- |
| I | P = 50 bar abs | P = 300 bar abs. |
| 0.4 | 5.0 | 21.9 |
| 1.0 | 7.2 | 30.8 |
| 2.0 | 8.5 | 34.9 |
| 2.5 | 8.8 | 35.2 |
| 3.0 | 8.9 | 35.7 |
| equilibrium | 9.12 | 35.9 |

These have also been proposals to incorporate cobalt into catalyst precursors made by fusion. Thus Pinto U.S. Pat. No. 4,298,588 discloses a composition similar to the standard but containing 5.2% cobalt (expressed as Co$_3$O$_4$) and that this has a value of I of 1.34.

The catalysts made from the precursors of the present invention have relative activities that are much higher than the aforesaid prior art catalysts and in particular have an initial activity of at least 2.0, particularly at least 2.5, and in some cases over 3.0.

Accordingly the present invention provides an oxidic, promoted, ammonia synthesis catalyst precursor composition having a BET surface area of at least 20 m$^2$.g$^{-1}$ and containing oxides of iron, aluminium, cobalt and an alkali metal of atomic number greater than, or equal to, 19, the proportion of said oxides being such that, after ignition at 600° C., the ignited composition contains 7 to 50, particularly 10 to 40, % by weight cobalt oxide (expressed as CoO), at least 0.5% by weight of alumina (expressed as $Al_2O_3$), from 0.1 to 1.5% by weight of said alkali metal oxide (expressed as $Y_2O$ where Y represents said alkali metal), and a total of iron oxide (expressed as $Fe_2O_3$) and cobalt oxide (expressed as CoO) of at least 75% by weight, said precursor being reducible by hydrogen to a catalyst that has a relative initial ammonia synthesis activity of at least 2.

The catalyst precursors of the invention may be made by precipitation of iron, cobalt, and aluminium compounds, calcination of the resultant precipitates, and impregnation of the precipitates with a solution of a compound of the promoter alkali metal before or after calcination.

The iron and cobalt are preferably "co-precipitated" by mixing an aqueous solution of a base with an aqueous solution containing salts, particularly nitrates, of cobalt and iron.

In a batch process, the solution of a base may be gradually added to the iron/cobalt salts solution or vice versa. The relative amounts of reactants are preferably such as to give final pH above 6.5, particularly above 8. In general, the higher the final pH, the greater the activity of the resultant catalyst. Although precipitation at lower final pH may given even greater surface areas, uniform dispersion of the promoter alkali becomes increasingly difficult as the surface area increases and the disadvantageous effect of non-uniform promoter dispersion on activity far outweighs the increase in activity given by increased surface area.

The aluminium may be "co-precipitated" with the iron and cobalt by including, in the solution containing the iron and cobalt salts, a suitable aluminium salt, e.g. aluminium nitrate, or using as the base an aqueous solution containing an alkali metal aluminate.

Alternatively the aluminium compound may be separately precipitated, preferably in the form of a gel: thus the aluminium may be precipitated to form a basic slurry of a precipitated aluminium compound and then the iron and cobalt precipitated by adding the solution containing the iron and cobalt salts to this basic slurry. Alternatively the iron and cobalt salts may be "co-precipitated" to form a slurry of precipitated iron and cobalt compounds and the aluminium precipitated by adding a solution of a suitable aluminium salt, e.g. aluminium nitrate, to the slurry of the precipitated iron and cobalt compounds. Yet another alternative is to "co-precipitate" the iron and cobalt to form a slurry of precipitated iron and cobalt compounds and to precipitate the aluminium separately as a slurry of a precipitated aluminium compound and then to mix the resultant slurries.

The preferred method is "co-precipitation" of the aluminium, iron, and cobalt compounds from a solution containing salts, e.g. nitrates, of all three metals.

As an alternative to batch precipitation which inevitably involves variation of pH during the course of the precipitation, a continuous technique may be employed wherein a solution of the iron, cobalt, and aluminium salts and a solution of a base are continuously fed to a precipitation vessel wherein the solutions mix and the precipitate forms and the precipitate is continuously removed from the vessel: the flow rates of the solutions are chosen to maintain the desired pH in the precipitation vessel.

In some cases, it may be desirable to include in the precursor a precipitated alkaline earth, e.g. calcium, barium, strontium, but particularly magnesium, compound as described in U.S. Ser. No. 758,412 filed July 24, 1985, the disclosure of which is incorporated herein be reference. As mentioned in that application, the manner in which the alkaline earth compound is precipitated can have an effect on the catalytic properties.

Thus the alkaline earth metal may be precipitated as an alkaline earth aluminate slurry by mixing a solution of an alkaline earth and an alkali metal aluminate, and the precipitated iron and cobalt compound slurry is then mixed with this precipitated aluminate slurry, or the iron and cobalt are precipitated into the precipitated aluminate slurry.

Alternatively a suitable alkaline earth salt, e.g. nitrate, can be included in the solution containing the iron and cobalt salts so that the alkaline earth compound is precipitated at the same time as the iron/cobalt compounds. The aluminium may also be present in this salts solution or may be separately precipitated as described above.

The iron and cobalt, and optionally also the aluminium and alkaline earth, if present, are preferably precipitated as hydrated oxides, hydroxides, carbonates, or basic carbonates.

The precipitation is preferably effected at a temperature of 15° to 65° C.

While the precipitation could be conducted using ammonia as the precipitant, undue wastage of cobalt is liable to occur as a result of the formation of cobaltammines. Therefore the precipitation is preferably effected with an alkali metal hydroxide or carbonate despite the undesirability of sodium in ammonia synthesis catalyst precursors and the relatively high cost of other alkali metals. Surprisingly even when using a sodium compound, e.g sodium carbonate, as the precipitant, precursors that give a particularly high catalytic activity can be obtained.

The iron is preferably precipitated as a hydrated ferric oxide. The precipitation conditions are preferably such as to produce the hydrated oxide in gel form, especially if hydrated alumina is co-precipitated with the iron oxide, since then the alumina can also be in gel form and crystallographic incompatibility can be avoided. Alternatively the hydrated oxide is in the lepidocrocite (gamma FeOOH) form, in which event the alumina can be in the isomorphous böhmite ("gamma AlOOH" or "alpha alumina monohydrate") form. If desired, the crystal shape of the lepidocrocite can be deliberately controlled, for example in acicular shape, possibly using a shape-stabilising additive. Another possibility is to produce hydrated ferric oxide in the goethite (alpha FeOOH) form) and to co-precipitate hydrated alumina in the diaspore ("beta alumina monohydrate") form as a minor component of mixed crystals.

The precipitate should then be washed, particularly where one or more of the reactants contained sodium, to remove soluble components. Normally the precipitate is then dried and calcined, typically at a temperature in the range 200°–500° C.: The requisite amount of alkali metal promoter can be incorporated by impregnating the precipitate before or after calcination with a suitable solution, e.g. potassium carbonate.

The resulting composition may then be pelleted or roll compacted: a fabrication aid such as graphite may be incorporated.

In preferred pelletised catalyst precursors, the iron oxide has an O:Fe atomic ratio in the range 1.2 to 1.4. Such materials may be obtained by the procedure described in U.S. Ser. No. 748,414 filed July 24, 1985 the disclosure of which is incorporated herein by reference.

In the precursors of the invention an alkali metal of atomic number greater than or equal to, 19 is incorporated as a promoter to increase the activity of the catalyst.

While synthesis catalysts containing only a small amount of alkali metal, whether or not they contain cobalt, may show a less pronounced catalytic activity decline and in some cases show an increase in activity with time, the level of activity of such catalysts is often inadequate. Addition of greater amounts of alkali metal to promote adequate activity generally results in a significant decline in activity with time, unless the composition also contains cobalt.

There will normally be an optimum alkali metal content: the optimum alkali metal oxide content of the composition after ignition will generally lie within the range 0.3 to 1.5% w/w.

In the precursors of the invention, after ignition the sum of the iron oxide and cobalt oxide contents is preferably above 80, particularly above 90% by weight, and especially in the range 94 to 98% by weight.

The alumina content (after ignition) is preferably in the range 1–10, particularly 2–6%, by weight. The cobalt oxide content (after ignition) is most preferably in the range 15 to 35% by weight.

Reduction of the precursor to active catalyst is conveniently effected by hydrogen at a temperature in the range 300°–500° C. The reducing gas used is usually ammonia synthesis gas and is passed over the precursor in the reactor in which synthesis is to take place. Precautions are taken to avoid back-diffusion of water vapour into contact with iron formed by the reduction and to prevent over-heating once ammonia synthesis has begun. Alternatively the precursor can be reduced by nitrogen-free hydrogen. In either event the gas pressure is suitably in the range 1–300, for example 20–120 bar abs. In an alternative procedure the precursor is reduced outside the synthesis reactor and passivated by cool dilute oxygen to give "pre-reduced" catalyst, which thereafter is charged to the synthesis reactor and therein fully reduced.

The resulting catalyst has a metal surface area significantly greater than that of a fused catalyst.

The invention also provides a process of ammonia synthesis over the catalyst and in these preferred conditions:

Temperature +C.: 300–500, especially 350–430.
Pressure, bar abs: 20–250, especially 40–120.
Gas mixture: $H_2/N_2$ up to 3.1, especially 2.5 to 3.0 or (as in our U.S. Pat. No. 4,383,982) 1.5 to 2.3.

As mentioned hereinbefore when tested under standard conditions, the catalysts obtained by reduction of precursors of the invention exhibit a relative activity greater than 2. In assessing the relative activity the following procedure is adopted.

A sample of the precursor are crushed to the sieve range 0.6 to 1.0 mm and charged to a laboratory reactor having a catalyst bed 3.2 mm in diameter and 32 mm long. The charge is activated by reduction in a 3:1 hydrogen:nitrogen mixture at 50 bar abs. pressure, raising the temperature to 475° C. over 12 h and holding that temperature for 3 h. The charge is operated in ammonia synthesis at that pressure at 450° C. and at a space velocity of 40,000 $cm^3$ of gas per g of catalyst per hour. From percentage conversions measured at this and other space velocities the "initial" rate constant, per unit catalyst precursor weight, is calculated. The hydrogen:nitrogen gas employed should of course be free of poisons, notably carbon oxides and water. The total carbon oxides and water content should both be below 1 ppm by volume.

To assess the rate of decline of activity on accelerated ageing procedure is then adopted by increasing the temperature to 550° C. and maintaining that temperature for 6 hours. The temperature is then reduced to 450° C. and the conversion at various flow rates measured. The "final" rate constant, per unit catalyst precursor weight, is then calculated.

The initial and final relative activities are the ratio of the initial and final rate constants, respectively, to the initial rate constant of the standard catalyst.

In the Examples a range of calcined, unpromoted, precipitates of differing cobalt contents were made. For each of these, a range of promoted precursors were obtained containing differing amounts of potassium, by wetting the calcined precipitate with an aqueous potassium carbonate solution. The resultant precursors were then tested as aforesaid.

It was clear that, for each set of samples of uniform cobalt content but varying promoter content, there was an optimum, in terms of activity, promoter content. In the Examples below, only the sample closest to the optimum is quoted.

EXAMPLE 1

An oxidic mixture was prepared by precipitation by adding an aqueous solution containing ferric nitrate, cobalt nitrate, and aluminium nitrate in the requisite proportions at 20° C. to an aqueous solution of sodium carbonate, initially at pH 10, to give a slurry. The proportion of sodium carbonate solution employed was such as to give a terminal pH of 7.

The precipitate was collected on a filter, washed until nitrate free, and dried at 120° C. The precipitate was calcined at 400° C. for 6 hours, ground, wetted with potassium carbonate solution to give the requisite potassium content, and then dried.

The product was then pelleted, using about 1% by weight of graphite as a pelleting aid, to form cylinders 8.8 mm diameter and 10 mm long. The above procedure was repeated, varying the proportions of cobalt nitrate and aluminium nitrate, to give a range of precursor compositions all of which had a BET surface area well above 20 $m^2.g^{-1}$.

| Sample | CoO (%) | $Al_2O_3$ (%) | $K_2O$ (%) | $Na_2O$ (ppm) | Relative Activity Initial | Relative Activity Final |
|---|---|---|---|---|---|---|
| 1.1+ | 7.1 | 2.7 | 0.7 | 30 | 2.6 | 2.3 |
| 1.2 | 9.1 | 2.6 | 0.7 | 35 | 2.9 | 2.6 |
| 1.3+ | 9.1 | 2.6 | 0.9 | 45 | 2.7 | 2.3 |
| 1.4 | 9.5 | 2.5 | 1.0 | ~1000 | 2.7 | 2.3 |
| 1.5+ | 9.5 | 2.5 | 0.9 | ~1000 | 2.7 | 2.3 |
| 1.6 | 16.2 | 1.6 | 0.7 | 150 | 2.8 | 2.1 |
| 1.7 | 18.7 | 2.6 | 0.8 | 30 | 3.1 | 2.6 |
| 1.8 | 20.1 | 2.5 | 0.8 | 70 | 2.8 | 2.4 |
| 1.9 | 21.9 | 2.6 | 0.8 | 60 | 2.9 | 2.5 |
| 1.10+ | 22.1 | 2.7 | 1.0 | 260 | 3.1 | 2.4 |
| 1.11+ | 34.5 | 3.2 | 1.1 | 100 | 2.9 | 2.4 |
| 1.12 | 35.2 | 3.5 | 0.8 | 30 | 2.7 | 2.4 |
| 1.13** | 68.0 | 3.4 | 1.1 | 500 | 0.04 | 0.05 |

*Composition (by weight)

-continued

| Sample | Composition* (by weight) | | | | Relative Activity | |
|---|---|---|---|---|---|---|
| | CoO (%) | Al₂O₃ (%) | K₂O (%) | Na₂O (ppm) | Initial | Final |
| 1.14** | 95.8 | 3.1 | 1.1 | NM | 0.01 | 0.02 |

+ calcination temperature 250° C.
*after ignition at 600° C. Balance is Fe₂O₃.
**comparative: the activities are negligible.
NM not measured.

EXAMPLE 2

The procedure of Example 1 was repeated except that a continuous precipitation technique was employed wherein the nitrates solution and sodium carbonate solution were continuously fed to a small precipitation vessel from which the precipitate was continuously removed. The sodium carbonate solution was added as such a rate as to maintain the desired pH in the precipitation vessel.

| Sample | pH | Composition* (by weight) | | | | Relative Activity | |
|---|---|---|---|---|---|---|---|
| | | CoO (%) | Al₂O₃ (%) | K₂O (%) | Na₂O (ppm) | Initial | Final |
| 2.1 | 8.5 | 14.8 | 2.5 | 0.7 | 30 | 3.2 | 2.6 |
| 2.2 | 6.9 | 15.2 | 2.4 | 0.7 | 280 | 2.9 | 2.3 |
| 2.3 | 6.8 | 17.2 | 2.3 | 0.4 | 110 | 3.1 | 2.5 |

*after ignition at 600° C. Balance is Fe₂O₃.

The variation in the sodium content of the samples 1.1 to 2.3 reflects variations in the thoroughness with which the precipitates were washed.

It is seen that the catalysts of the invention have a high relative activity. This increased activity enables lower ammonia converter temperatures to be employed thus enabling the converter pressure to be reduced, compared to conventional conditions, with consequent savings in compression costs.

I claim:

1. An oxidic, promoted, ammonia synthesis catalyst precursor composition having a BET surface area of at least 20 $m^2.g^{-1}$ and containing oxides of iron, aluminum, cobalt, and an alkali metal of atomic number greater than, or equal to, 19 obtained by precipitation of iron, cobalt and aluminum compounds, calcination of the resultant precipitates and impregnation of the precipitates with solution of a compound of the alkali metal before or after calcination, the proportion of said oxides being such that, after ignition at 600° C., the ignited composition contains 7 to 50% by weight of cobalt oxide (expressed as CoO), at least 0.5% by weight of alumina (expressed as Al₂O₃), from 0.1 to 1.5% by weight of said alkali metal oxide (expressed as Y₂O where Y represents said alkali metal), and a total of iron oxide (expressed as Fe₂O₃) and cobalt oxide (expressed as CoO) of at least 75% by weight, said precursor being reducible by hydrogen to a catalyst that has a relative initial ammonia synthesis activity of at least 2.

2. A composition according to claim 1 wherein, after ignition at 600° C., the ignited composition contains 10 to 40% by weight of cobalt oxide (expressed as CoO).

3. A composition according to claim 2 wherein, after ignition at 600° C., the ignited composition contains 15 to 35% by weight of cobalt oxide (expressed as CoO).

4. A composition according to claim 1 wherein, after ignition at 600° C., the ignited composition contains a total of iron oxide (expressed as Fe₂O₃) and cobalt oxide (expressed as CoO) of above 90% by weight.

5. A composition according to claim 1 wherein, after ignition at 600° C., the ignited composition contains 2 to 6% by weight of alumina (expressed as Al₂O₃).

6. A process for the production of a precursor composition according to claim 1 comprising mixing an aqueous solution containing salts of iron, cobalt, and aluminium with an aqueous solution of sodium carbonate in such proportions as to give a final pH of at least 6.5, washing, drying and calcining the resultant precipitate at a temperature in the range 200° to 500° C., and impregnating the precipitate with a solution of a compound of an alkali metal of atomic number greater than, or equal to, 19 before or after calcination.

* * * * *